United States Patent [19]

Sato

[11] Patent Number: 5,815,630
[45] Date of Patent: Sep. 29, 1998

[54] TAPE DUBBING AND COPY GUARD SIGNAL INSERTING METHOD AND APPARATUS

[75] Inventor: Yoich Sato, Ibaraki-ken, Japan

[73] Assignee: Victor Company of Japan, Ltd., Yokohama, Japan

[21] Appl. No.: 862,577

[22] Filed: May 23, 1997

Related U.S. Application Data

[63] Continuation of Ser. No. 402,017, Mar. 10, 1995, abandoned.

[30] Foreign Application Priority Data

Sep. 29, 1994 [JP] Japan .................................. 6-259128

[51] Int. Cl.[6] .................................................. H04N 9/825
[52] U.S. Cl. ............................... 386/44; 360/60; 380/22; 386/94
[58] Field of Search ............................ 386/44, 94, 4, 386/36, 64, 52, 122, 1, 39; 380/5, 22, 14; 360/15, 60; 348/478, 663; H04N 9/825

[56] References Cited

U.S. PATENT DOCUMENTS

| 4,631,603 | 12/1986 | Ryan . | |
|---|---|---|---|
| 5,103,297 | 4/1992 | Yamade | 348/478 |
| 5,130,864 | 7/1992 | Shimada | 360/60 |
| 5,134,496 | 7/1992 | Schwab et al. | 386/94 |
| 5,150,202 | 9/1992 | Ledinh et al. | 348/663 |
| 5,179,452 | 1/1993 | Takahashi | 358/335 |
| 5,194,963 | 3/1993 | Dunlap et al. | 386/9 |
| 5,208,708 | 5/1993 | Mok | 360/60 |
| 5,251,041 | 10/1993 | Young et al. | 386/44 |
| 5,303,294 | 4/1994 | Kimoto et al. | 380/5 |
| 5,311,323 | 5/1994 | Honda | 358/335 |
| 5,327,296 | 7/1994 | Nagasawa | 360/15 |
| 5,418,853 | 5/1995 | Kanota et al. | 380/5 |
| 5,459,583 | 10/1995 | Nakata | 358/335 |
| 5,481,411 | 1/1996 | Nakatani | 358/311 |
| 5,504,815 | 4/1996 | Ryan et al. | 348/663 |

FOREIGN PATENT DOCUMENTS

| A-0 519 320 | 12/1992 | European Pat. Off. . |
| A-0 585 497 | 3/1994 | European Pat. Off. . |
| A-63 211980 | 9/1988 | Japan . |
| A-05 191774 | 7/1993 | Japan . |

Primary Examiner—Amelia Au
Assistant Examiner—Y. Lee
Attorney, Agent, or Firm—Michael N. Meller

[57] ABSTRACT

A high-speed tape dubbing method and apparatus for dubbing a signal recorded on a master tape onto slave tapes running at a speed N (for example, 3) times a standard tape running speed, which is capable of inserting a copy guard signal without degradation of image quality, during a time period in which the signal is processed in digital form and a copy guard signal inserting apparatus for use in the tape dubbing apparatus are provided. The copy guard signal is inserted by digitally processing the signal by the copy guard signal inserting apparatus during a vertical blanking period of a digital luminance signal whose speed is made N times the standard speed by a signal arrangement converter/digital rate converter. The digital luminance signal to which the copy guard signal is inserted is converted into an analog signal by a D/A converter and recorded by respective slave recording apparatuses together with the chroma signal.

3 Claims, 8 Drawing Sheets

TAPE DUBBING AND COPY GUARD SIGNAL INSERTING METHOD AND APPARATUS

This application is a continuation of application Ser. No. 08/402,017, filed Mar. 10, 1995 now abandoned.

BACKGROUND OF THE INVENTION

1. Field of the Invention

The present invention relates to a tape dubbing method and apparatus for producing, from a master tape, recorded magnetic tapes such as prerecorded video tapes by dubbing the master tape at a speed N times a recording speed of the master tape, where N is an integer larger than 1, and copy guard signal inserting system for use in the dubbing system.

2. Description of the Prior Art

In order to prevent illegal dubbing of a prerecorded video tape such as movie recorded video cassette tape for commercial use, a copy guard signal has been inserted in the prerecorded video tape. A typical example of the copy guard signal is one proposed by Macrovision Inc. (see Japanese Patent Application Laid-open No. S61-288582).

Figure 1:
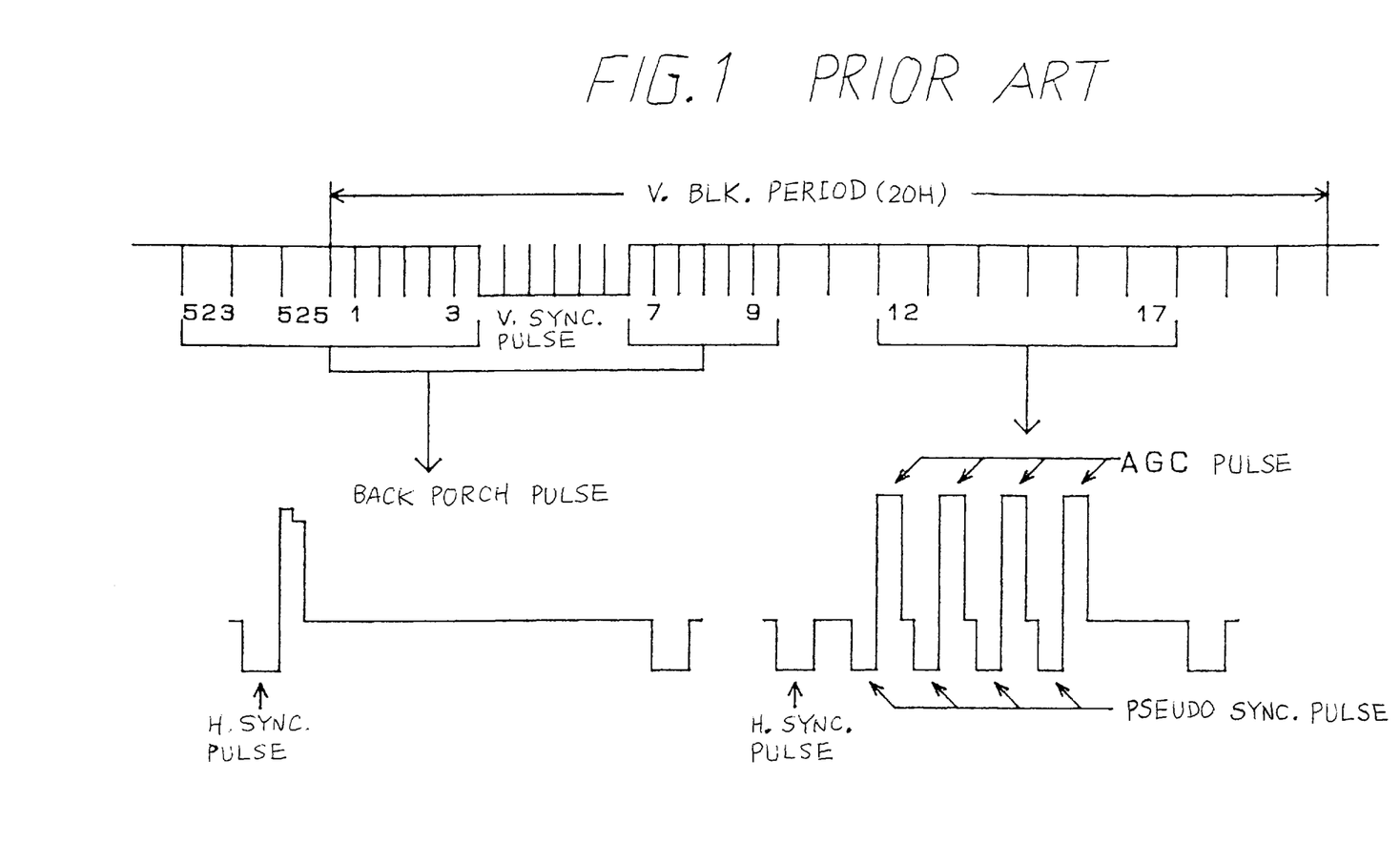
FIG. 1 shows a waveform of a copy guard signal.

This copy guard signal is inserted in a vertical blanking period (20H) where H is a horizontal synchronizing period of a video signal as shown in FIG. 1. Basically, a back porch pulse, an AGC pulse and a pseudo-synchronizing pulse, etc., are inserted as the copy guard signal. The copy guard signal allows a normal color image to be reproduced for a television receiver and functions to prevent a normal recording operation for a commercially available videotape recorder (VTR). In essence, the copy guard signal causes an AGC circuit of the VTR to operate erroneously.

Figure 2:
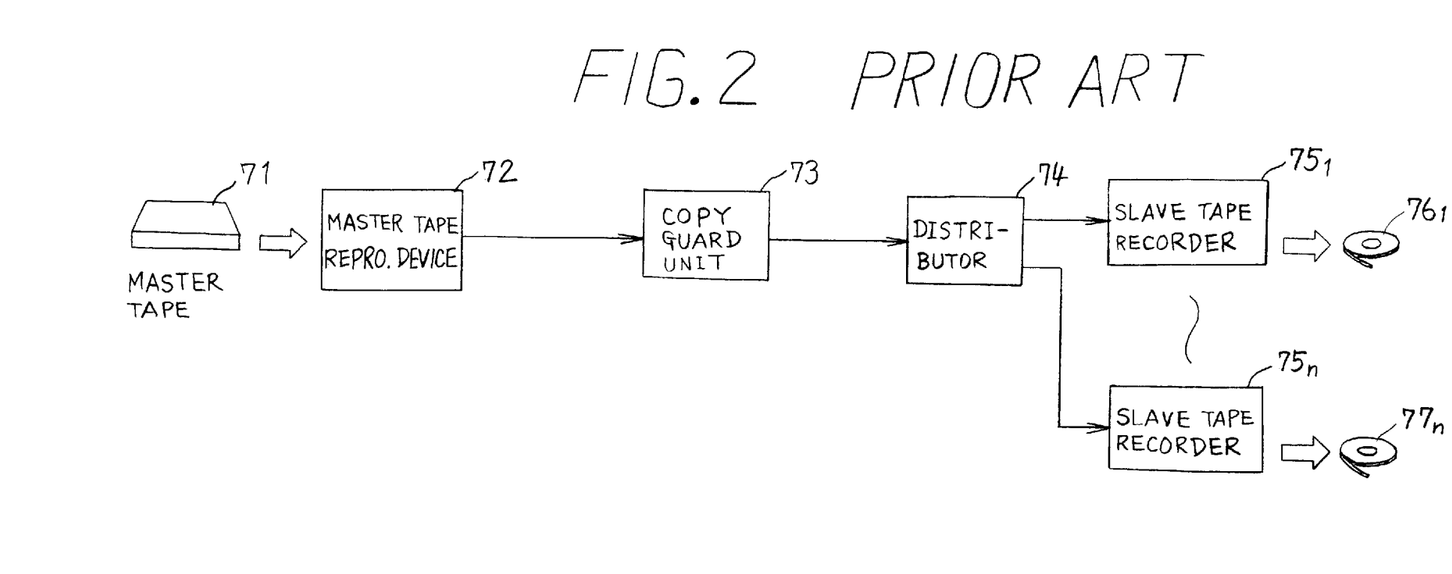
FIG. 2 shows a conventional normal speed analog dubbing apparatus.

FIG. 2 shows a conventional normal speed analog dubbing apparatus for producing commercially available prerecorded video tapes.

A digital signal recorded on a master tape 71 is converted into an analog signal and reproduced by a master tape reproducing device (digital composite VTR) 72. The reproduced signal (analog composite signal) is supplied to a copy guard unit 73 in which the copy guard signal is added. The signal into which the copy guard signal is inserted is distributed through a distributor 74 to respective slave tape recorders $75_1$ to $75_n$ in which it is recorded on respective slave tapes. The slave tapes thus recorded are commercially available prerecorded video tapes $76_1$ to $76_n$. Each of the slave tape recorders $75_1$ to $75_n$ has, of course, a function of normally recording a video signal without influence of the copy guard signal.

Since, in the above-mentioned dubbing apparatus, the signal transmission from the master tape reproducing device 72 to the distributor 74 is performed in an analog format, the insertion of the copy guard signal is performed by using an analog signal (that is, an analog composite signal).

Therefore, the original video signal is unavoidably distorted to some extent by the insertion of the copy guard signal. Further, since the distance between the master tape reproducing device 72 and the distributor 74 in the dubbing device is usually tens of meters over which the analog signal is transmitted, degradation of image quality is also unavoidable.

Figure 3:
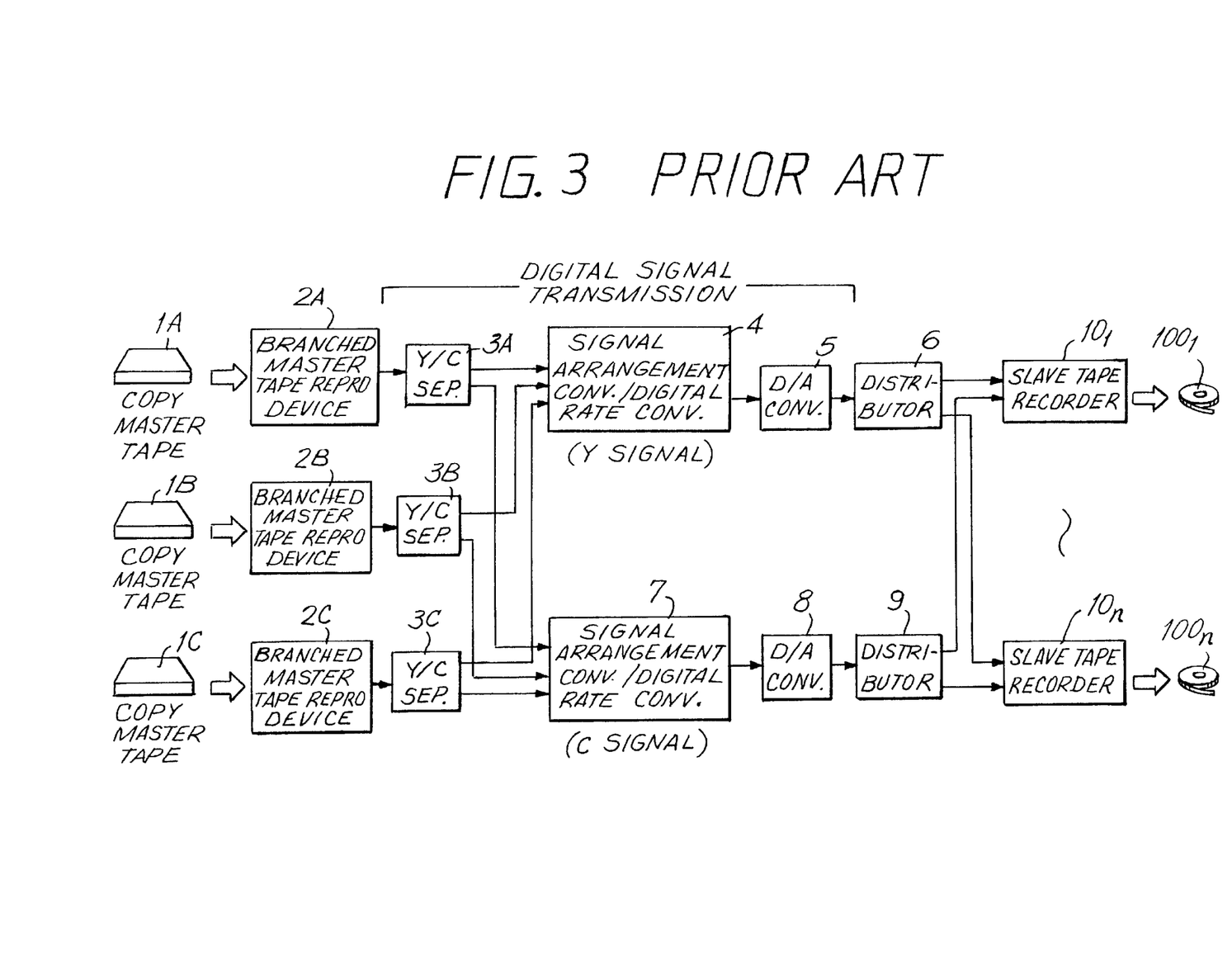
FIG. 3 shows a conventional three-time speed digital tape dubbing apparatus.

FIG. 3 shows a tape dubbing apparatus which can solve the problem of degradation of image quality. In this dubbing apparatus, in order to prevent degradation of image quality between master tape reproducing devices 2A to 2C (in this example, digital composite VTRs of D3 format) and distributors 6 and 9, signal transmission therebetween is performed in a digital format. Further, in this dubbing apparatus, the dubbing speed is three times the normal speed. This dubbing device is achieved by a technique disclosed in Japanese Patent Application Laid open No. H4-247304 assigned to the same assignee as that of the present application where N is 3.

Figure 4A:
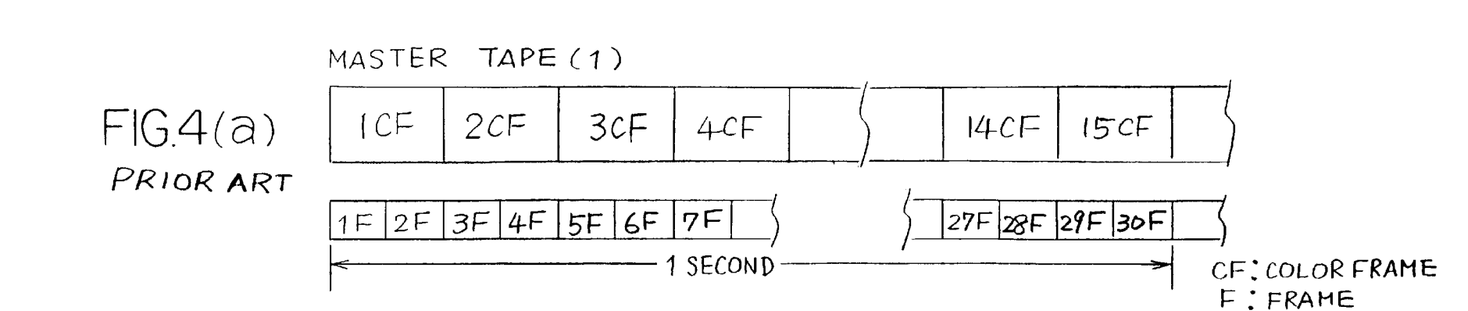
FIG. 4 illustrates a recorded content of a master tape and three branched master tapes to be used in the apparatus in FIG. 3.
Figures 4B, 4C:
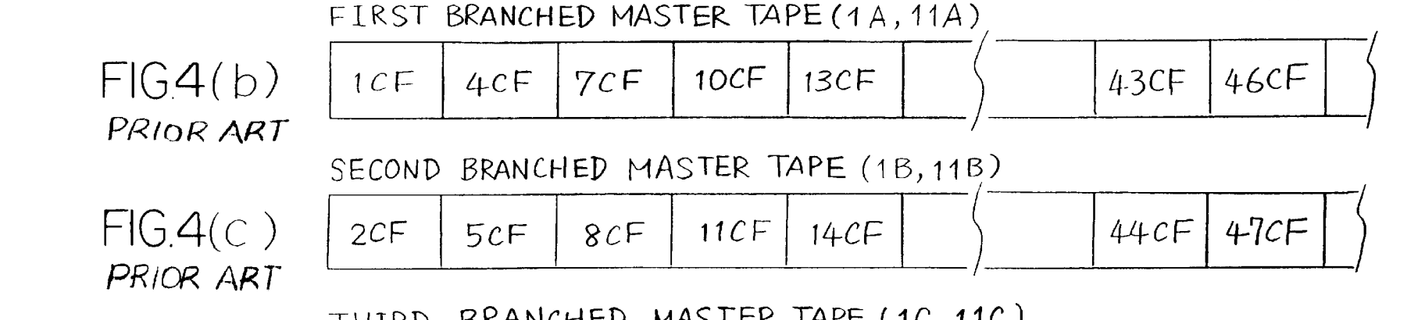
Figure 4D:
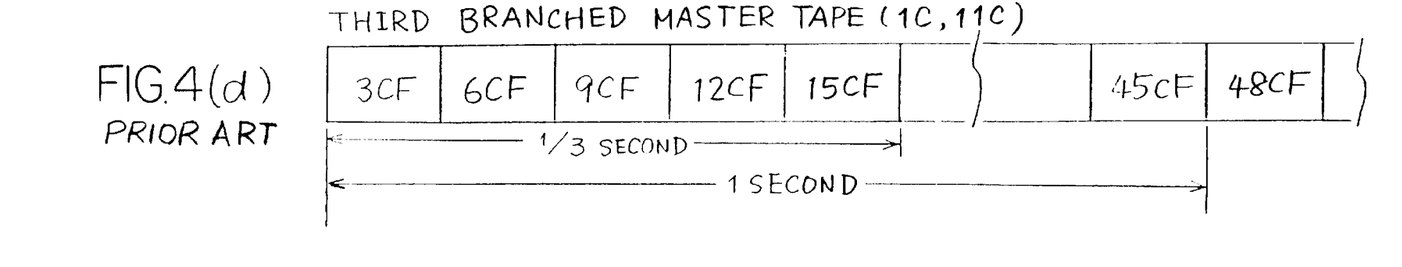

The tape dubbing apparatus shown in FIG. 3 will be briefly described. FIG. 4 Mustrates a recorded content of a master tape 1 and three branched master tapes 1A, 1B and 1C. A digital master signal is recorded on the master tape 1 shown in FIG. 4(a). The master signal is branched time-divisionally by changing the time series arrangement of the master signal into three branched master signals every one color frame (CF), that is two frames (F). Three branched master signals are recorded on thee branched master tapes 1A to 1C shown in FIG. 4(b) to 4(d), respectively. Three branched master tapes 1A to 1C are reproduced synchronously as digital composite signals by three branched master tape reproducing devices 2A to 2C, respectively.

The reproduced digital composite signals are separated by Y/C separators 3A to 3C to luminance signals (Y signals) and chroma signals (C signals), respectively. The Y signals and the C signals are increased in speed threefold by signal arrangement/digital rate converters 4 and 7, respectively. That is, these signals are made signals which are compressed in time to ⅓ and made their time series arrangement the same as that of the master signal.

The signals whose speed is increased three times are converted into analog signals by D/A converters 5 and 8 and the thus obtained analog signals are distributed to respective slave tape recorders $10_1$ to $10_n$ of three-time speed by distributors 6 and 9 and recorded on slave tapes, respectively. The thus obtained slave tapes are commercially available prerecorded video tapes $100_1$ to $100_n$.

The tape dubbing apparatus shown in FIG. 3 can perform a dubbing without degradation of image quality by the use of digital signal transmission and can perform the dubbing highly efficiently by increasing the master signal speed threefold.

On the other hand, if a copy guard signal can be inserted during the transmission of digital signal, both the problem of distortion and the problem of degradation of image quality can be solved. However, the current copy guard inserting apparatus is usable for only an original speed dubbing of an analog signal and cannot be used in a high-speed dubbing apparatus for digital signal such as shown in FIG. 3.

BRIEF SUMMARY OF THE INVENTION

Object of the Invention

An object of the present invention is to provide a high-speed tape dubbing method and apparatus in which, in dubbing a master signal at a speed N times the normal speed, a copy guard signal can be inserted during a digital signal transmission without degradation of image quality.

Another object of the present invention is to provide a copy guard signal inserting apparatus capable of inserting a copy guard signal in a digital signal for recording at a speed N times the normal speed.

Brief Summary

According to a first aspect of the present invention, there is provided a tape dubbing apparatus comprising N (N is an integer greater than 1) branched master tape reproducing devices for synchronously reproducing a corresponding one of branched master tapes respectively recorded with N branched master digital signals obtained by branching time-divisionally an original master signal by N and for outputting said N branched master digital signals, said original master signal having an original data sequence, N-time speed recording signal generators for compressing the N branched master digital reproduced signals to 1/N in time and for generating a digital signal having the same time series arrangements as that of a original master signal, copy guard signal inserting devices for inserting copy guard signals into the digital signal output from the N-time speed recording signal generators, respectively, D/A converters for converting the digital signals having the copy guard signals inserted therein into analog signals and recording devices for recording the output signal of the D/A converters on slave tapes at a tape speed N times the normal tape speed without being affected by the copy guard signals.

According to a second aspect of the present invention, there is provided a copy guard signal inserting apparatus comprising a signal generator for generating an N-time speed, digital copy guard signal functioning to allow a television receiver to perform a normal color image reproduction and to prevent a normal recording operation of a video recording device and an inserting device for inserting the copy guard signal output from the signal generator into a vertical blanking period of an N-time speed recording digital video signal.

The above and other related objects, features and advantages of the present invention will become apparent from a reading of the following description of the disclosure found in the accompanying drawings and the novelty thereof pointed out in the appended claims.

DETAILED DESCRIPTION OF THE INVENTION

Figure 5:
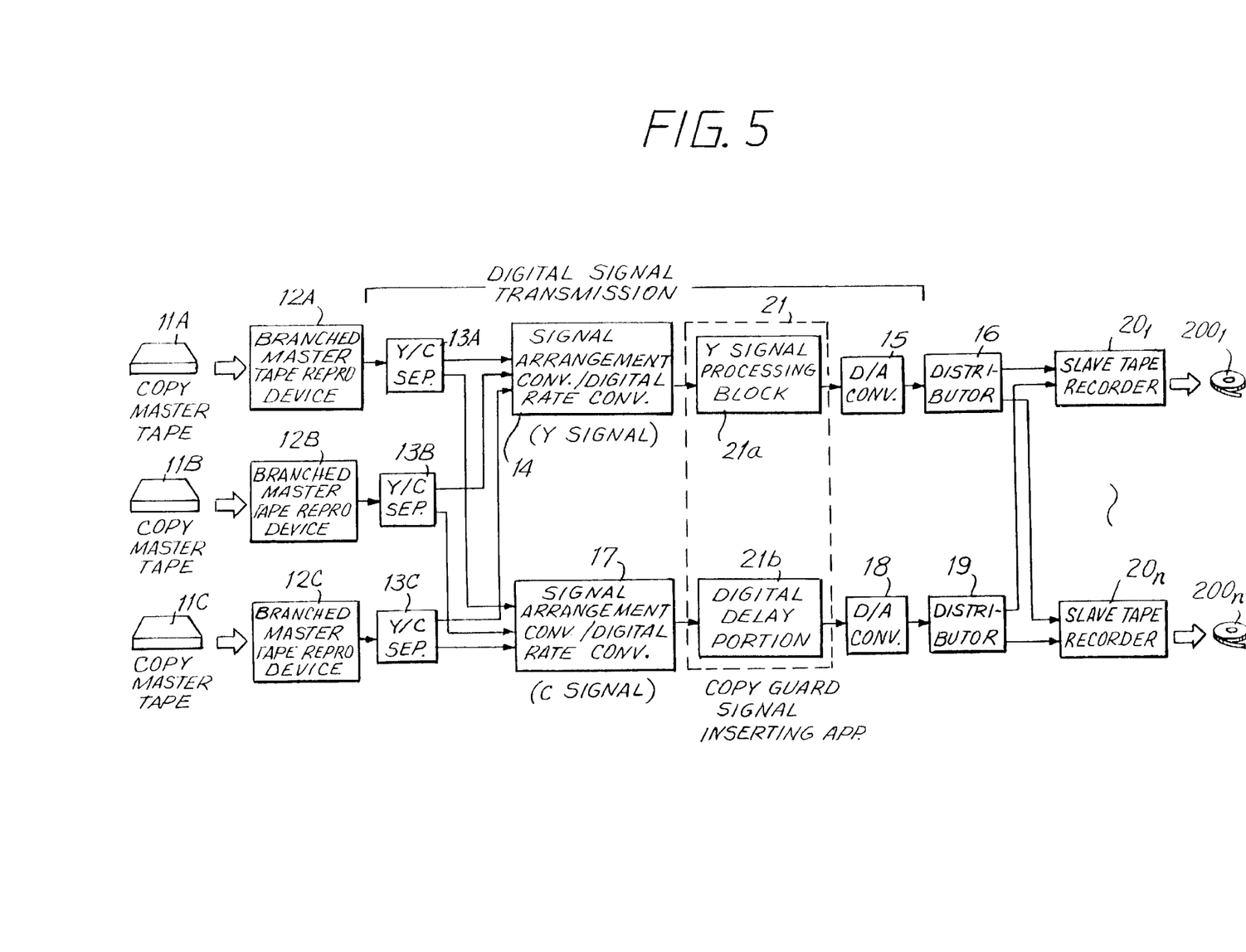
FIG. 5 shows a tape dubbing apparatus according to an embodiment of the present invention.

Preferred embodiments of the present invention will be described in detail with reference to the accompanying drawings.
Tape Dubbing Apparatus:

FIG. 5 shows a tape dubbing apparatus according to an embodiment of the present invention, in which an N-time tape speed, that is, a tape speed N times the normal tape speed, is a triple speed.

An original digital master signal is recorded on the master tape 1 shown in FIG. 4(a). The original digital master signal is branched time-divisionally by changing the time series arrangement of the master signal into three branched master digital signals every one color frame (CF), that is two frames (F). Three branched master digital signals are recorded on three branched master tapes 11A to 11C shown in FIG. 4(b) to 4(d), respectively. Three branched digital signals are reproduced synchronously as digital composite signals by three branched master reproducing devices 12A to 12C, respectively. In this case, each of the branched master reproducing apparatuses is a digital composite VTR of the D3 format.

The reproduced digital composite signals are separated into luminance signals (Y signals) and chroma signals (C signals) by Y/C separators 13A to 13C, respectively. The Y signals and the C signals are supplied to signal arrangement/digital rate converters 14 and 17, respectively, in which they are increased in speed threefold. That is, they are compressed in time to ⅓, respectively, and their time series sequence is made identical to that of the original digital master signal.

The time-compressed Y and C signals are processed separately by a digital copy guard signal inserting apparatus 21. The copy guard signal which is a signal obtained by time compressing the signal shown in FIG. 1 to ⅓ and digitizing it is inserted into the Y signal in the vertical blanking period by a Y signal processing block 21a of the digital copy guard signal inserting apparatus 21. The C signal is delayed by a time corresponding to a signal insertion processing time for the Y signal, by a digital delay portion 21b of the digital copy guard signal inserting apparatus 21.

The Y and C signals from the copy guard signal inserting apparatus 21 are converted into analog signals by D/A converters 15 and 18, respectively. They are then distributed by distributors 16 and 19 to slave tape recorders $20_1$ to $20_n$ in which they are recorded on slave tapes, respectively. The slave tapes on which the signals are recorded become commercially available prerecorded video tapes $200_1$ to $200_n$.

It should be noted that the respective slave tape recording devices are preliminarily processed such that they can record normally without influence of the copy guard signal.

Thus, the tape dubbing apparatus of this embodiment can insert the copy guard signal into the master recording signal in a digital form and therefore there is no degradation of image quality. Further, since the copy guard signal can be inserted into the time-compressed, digital recording signal, the embodiment of the present invention can be applied to a high-speed dubbing.
Copy Guard Signal Inserting Apparatus:

The copy guard signal inserting apparatus 21 will be described in detail with reference to FIGS. 6 and 7.

Figure 6:
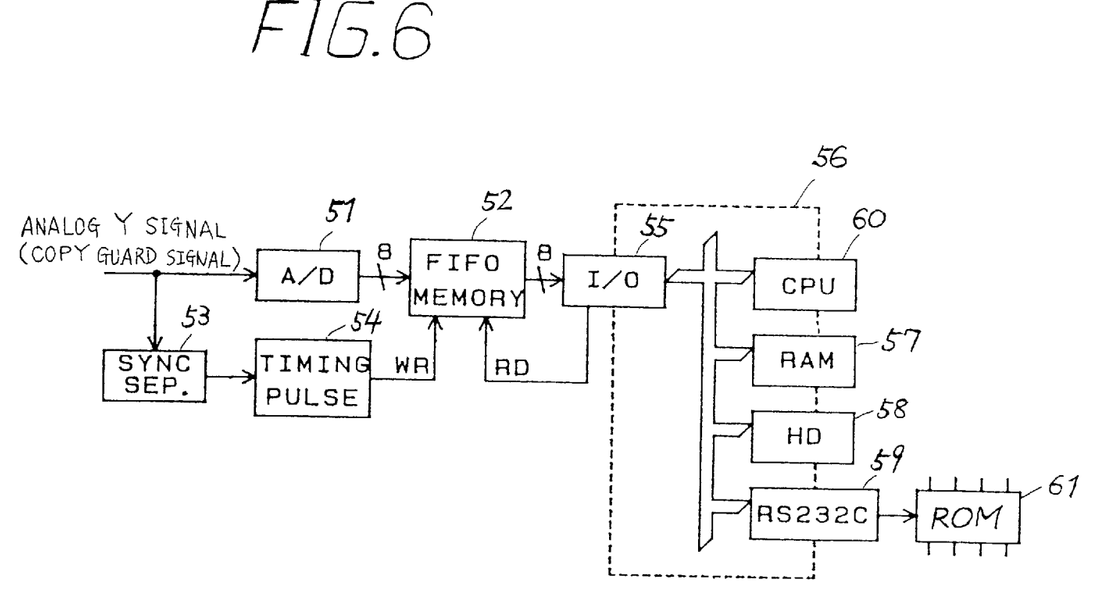
FIG. 6 is a block diagram of a copy guard signal inserting apparatus according to an embodiment of the present invention, explaining a data write of a copy guard signal data ROM contained in the copy guard signal inserting apparatus.

FIG. 6 is useful in understanding a data write process to a ROM (Read-Only-Memory) 61 which is contained in the copy guard signal inserting apparatus 21 for writing the copy guard signal.

In FIG. 6, in order to write the copy guard signal into the ROM 61, an analog Y signal which is output from a conventional copy guard signal inserting apparatus is converted into an 8-bit digital signal by an A/D converter 51. This analog Y signal is used for normal speed analog signal dubbing and includes the copy guard signal as well as a composite synchronizing signal. The Y signal is supplied to a sync separator 53 to separate the synchronizing signal. The synchronizing signal thus separated is supplied to a timing pulse generator circuit 54 to obtain a timing pulse.

The 8-bit digital signal from the A/D converter 51 is written in a FIFO (First-in, First-out) memory 52 using the timing pulse as a write pulse. The digital signal is read out from the FIFO memory 52 using a pulse from an I/O interface 55 as a read pulse and is transferred at high speed to a RAM Random-Access-Memory) 57 contained in a personal computer 56 through the I/O interface 55.

By temporarily storing the digital signal in the FIFO memory 52 and then transferring it to the RAM, a difference in timing between data pick up from the FIFO memory 52 and data write in the RAM 57 is absorbed. The copy guard signal, that is, digital data, written in the RAM 57 is stored in a hard disk (HD) 58 in a Text-File format after the data pick up is terminated and A/D pick up error and noise are corrected by an editor under control of a CPU (Central Processing Unit) 60.

It should be noted that it may be possible not to pick up the copy guard signal from the analog signal but to directly generate waveform data of the copy guard signal by means of the editor.

The data thus obtained is transferred in a serial transmission to a ROM-Writer (not shown) through an RS232C terminal 59 and written in the ROM 61.

Figure 8:
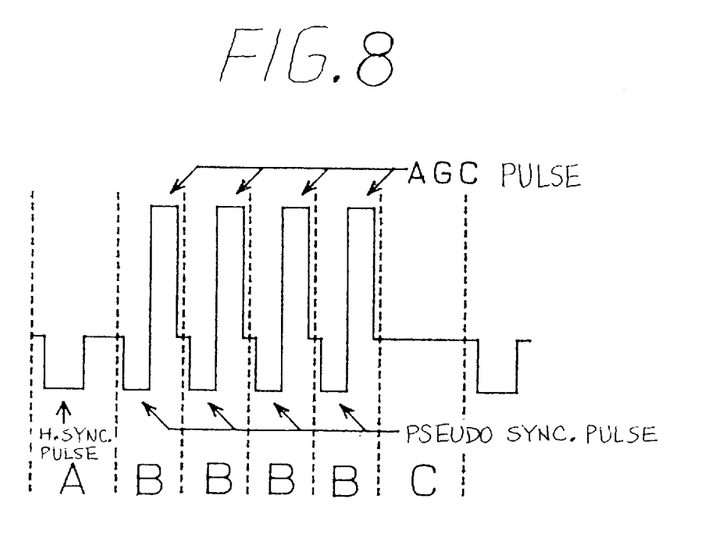
FIG. 8 shows a portion of a copy guard signal waveform according to an embodiment of the present invention.

FIG. 8 shows a portion of the copy guard signal waveform according to an embodiment of the present invention. In FIG. 8, data A, B and C, which are obtained by dividing the copy guard signal every horizontal line (1H), are written in the ROM 61 one by one. When data B appear successively, the data B are continuously read out from the ROM 61, so that it is possible to compress the capacity of the ROM.

Figure 7:
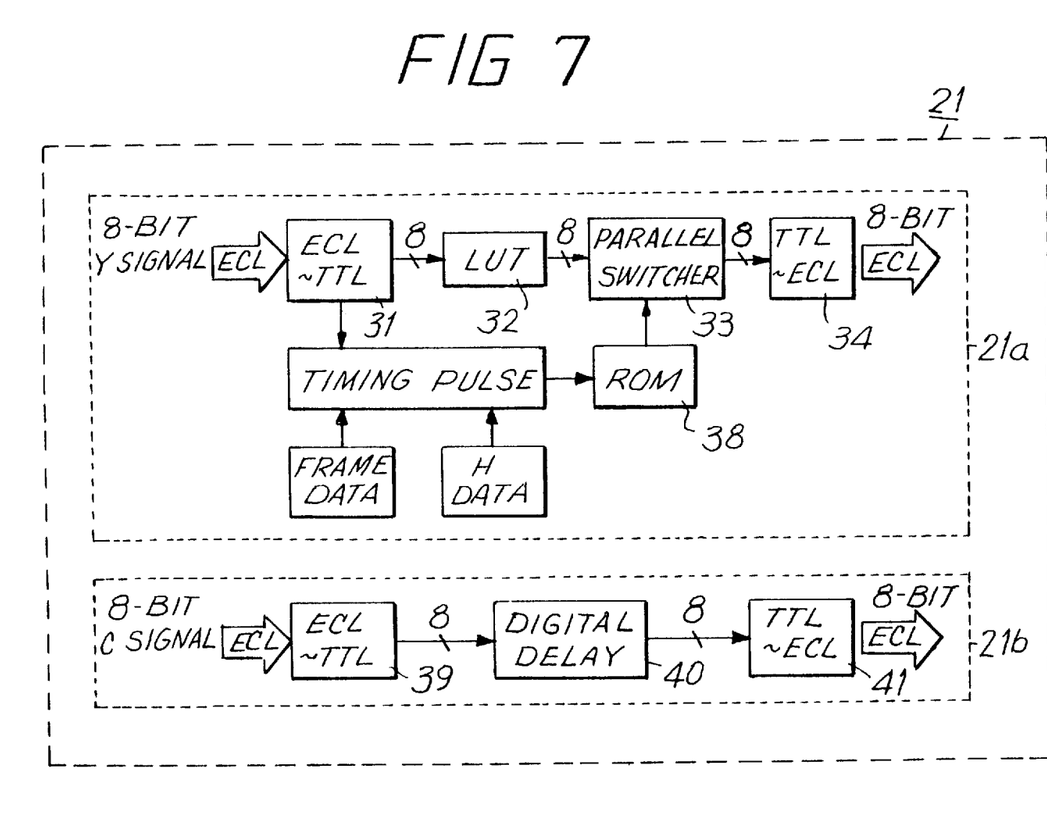
FIG. 7 is a block diagram showing the internal construction of the copy guard signal inserting apparatus according to an embodiment of the present invention.

FIG. 7 shows the internal construction of the copy guard signal inserting apparatus according to an embodiment of the present invention.

The copy guard signal inserting apparatus 21 shown in FIG. 7 is composed of the Y signal processing block 21*a* and the digital delay portion 21*b* which is the C signal processing block, as mentioned previously. The ROM 38 in which the copy guard signal data is written is built in the Y signal processing block 21*a*.

For signal processing in the Y signal processing block 21*a*, the time-compressed, 8-bit digital Y signal is level-converted from ECL (Emitter Coupled-Logic-Level) into a TTL (Transistor-Transistor Logic) level by an ECL/TTL converter circuit 31. A data table which is used for the level-convertion of a input digital signal, that is digital data, is prestored in a ROM/RAM which is contained in a look up table (LUT) 32. The digital signal inputted in the LUT 32 is level-converted by using the data table prestored in the ROM/RAM and proceeding nonlinearly so that the sync chip level of the input digital signal correspond to the copy guard signal level. The level-converted digital signal is supplied to a parallel switcher 33. The LUT 32 also has a function of limitter so that the input digital signal does not exceed the maximum level which can be recorded by the VTR.

The output data of the ECL/TTL converter circuit 31 is also supplied to a timing pulse generator circuit 35. The timing generator circuit 35 generates a timing pulse on the basis of a frame data output from a frame data generator circuit 36 which represents the timing of one frame and an H data output from an H data generator circuit 37 which represents the timing of one horizontal scan period.

The copy guard signal data is read out from a ROM 38 having the copy guard signal written therein using the timing pulse output from the timing pulse generator circuit 35 and is supplied to the parallel switcher 33.

The copy guard signal waveform shown in FIG. 8 is obtained by reading the data in the ROM 38 in a sequence A→B→B→B→C using the H data of the timing pulse. Further, a variation of level of an AGC pulse (variation of time axis) can be compensated for by using the frame data and it is possible to make the copy guard signal data read out from the ROM 38 a data of N-time (in this embodiment, N equals three) speed by making the frame data and the H data correspond to data of N-time speed.

Returning to FIG. 6, the copy guard signal data readout from the ROM 38 and time-compressed is inserted by the parallel switcher 33 into the digital Y signal of N-time speed during the vertical blanking period thereof. The output of the parallel switcher 33 is level-converted from TTL level to ECL level by a TTL/ECL converter circuit 34 and output as an 8-bit digital Y signal of N-time speed.

In the digital delay portion 21*b* which is the C signal processing block, the 8-bit digital C signal (ECL level) of N-time speed is level-converted from ECL level to TTL level by an ECL/TTL converter circuit 39 as was done for the Y signal. Thereafter, in order to match its timing to that of the Y signal, the C signal is delayed by a digital delay circuit 40 by a time corresponding to a time necessary to insert the copy guard signal in the Y signal processing block 21*a*. The output of the digital delay circuit 40 is level-converted from TTL level to ECL level by a TTL/ECL converter circuit 41 and output as an 8-bit digital C signal of N-time speed.

The Y signal processing block 21*a* may insert other special effect signals into the Y signal during transmission thereof in digital form, by changing a combination of the data written in the ROM, the H data and the frame data. Further, by using a block similar to the block 21*a* instead of the digital delay portion 21*b*, a signal such as an image quality confirming signal can be inserted into the C signal for purpose of quality control.

What is claimed is:

1. A tape dubbing apparatus comprising:

a plurality N of branched master tape reproducing means for synchronously reproducing a corresponding one of branched master tapes respectively recorded with N branched master digital signals obtained by branching time-divisionally an original master signal by N and for outputting said N branched master digital signals, said original master signal having an original time series arrangement, where N is an integer greater than 1;

N-time speed recording digital video signal generating means for compressing said N branched master digital reproduced signals to 1/N in time and for generating a digital signal having the same time series arrangement as that of said original master signal;

copy guard signal generating means for generating an N-time normal speed, digital copy guard signal to allow a television receiver to perform normal color image reproduction and to prevent normal recording operation of a video recording device;

copy guard signal inserting means for inserting said copy guard signal into a vertical blanking period of said N-time speed recording digital video signal;

D/A converter for converting said N-time speed recording digital video signal having said copy guard signal inserted therein into an analog signal;

recording means for recording the output signal of said D/A converter on slave tape at a tape speed N times a normal tape speed without being affected by said copy guard signal; and wherein said N-time speed recording digital video signal includes a luminance signal and a chroma signal, means for separating said luminance and chroma signals, and wherein said inserting means inserts said copy guard signal during a vertical blanking period of said separated luminance signal, and includes a chroma signal delay means for delaying said separated chroma signal with respect to said luminance signal by a time necessary for the insertion of said copy guard signal.

2. A copy guard signal inserting apparatus comprising:

signal generating means for generating an N-time normal speed, digital copy guard signal functioning to allow a television receiver to perform a normal color image reproduction and to prevent a normal recording operation of a video recording device, where N is an integer greater than 1;

inserting means for inserting said copy guard signal output from said signal generating means into a vertical blanking period of an N-time speed recording digital video signal; and wherein said N-time speed recording digital video signal includes a luminance signal and a chroma signal, means for separating said luminance and chroma signals, and wherein said inserting means inserts said copy guard signal during a vertical blanking period of said separated luminance signal, and includes a chroma signal delay means for delaying said separated chroma signal with respect to said luminance signal by a time necessary for the insertion of said copy guard signal.

3. A method of tape dubbing comprising the steps of:

synchronously reproducing a corresponding one of branched master tapes respectively recorded with N branched master digital signals obtained by branching time-divisionally an original master signal having an original time series arrangement by N, where N is an integer greater than 1;

time compressing said N branched master digital reproduced signals to 1/N, respectively, and producing an N-time speed recording digital video signal by making a time series arrangement of time-compressed N reproduced digital signals to that of said original master signals said N-time speed recording digital video signal including a luminance signal and a chroma signal;

separating said luminance and chroma signals;

generating an N-time normal speed, digital copy guard signal to allow a television receiver to perform normal color image reproduction and to prevent normal recording operation of a video recording device;

inserting said copy guard signal into a vertical blanking period of said separated luminance signal of said N-time speed recording digital video signal;

delaying said separated chroma signal with respect to said luminance signal by a time necessary for the insertion of said copy guard signal;

converting said N-time speed recording digital video signal having said copy guard signal inserted therein into an analog signal; and recording the analog converted signal on slave tapes running at a tape speed N times a normal tape speed without being affected by said copy guard signal.

* * * * *